United States Patent Office 3,304,215
Patented Feb. 14, 1967

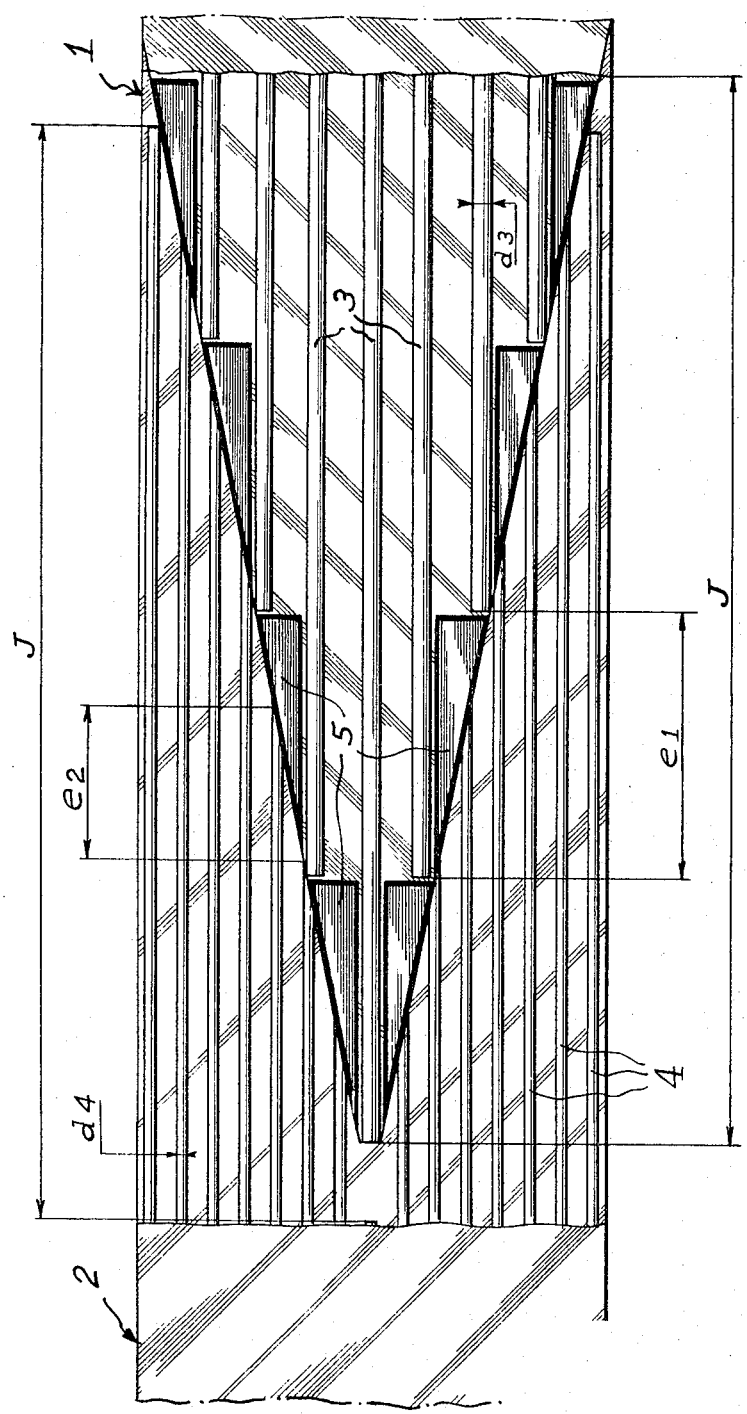

3,304,215
METHOD FOR JOINING CONVEYOR BELTS
Francis Victor Frederic Paul, Paris, France, assignor to Pneumatiques, Caoutchouc Manufacture and Plastiques Kleber-Colombes, Paris, France, a corporation of France
Filed Mar. 23, 1964, Ser. No. 353,798
4 Claims. (Cl. 156—137)

The joining of conveyor belts longitudinally reinforced with steel wires or cables is known when the ends of the belt to be joined together are of the same structure. Such a method has optimum results and is described in French Patent No. 1,115,443 of the October 12, 1954, and its additions.

No satisfactory method has been found to date for the joining of two conveyor belts reinforced with longitudinal steel cables when the conveyor belts are of different structure (different types of cables differently spaced from one another). This problem arises when it is necessary to use, on the same conveyor, belts produced by different manufacturers who do not work to the same specifications, even in order to produce belts of equal strength. The same difficulty can also arise when it is necessary to use in an emergency whatever belts one has available, for example when it is necessary to extend a conveyor or to replace one part of the belt at a time when there are only belts of different working loads in stock.

One of the belts to be joined in such circumstances will always have a reinforcement constituted by cables of larger diameter than the cables of the other.

The present invention has as its object a method for joining two belts of different structure each of which is reinforced by at least one longitudinal layer of parallel cables. By "cables" is meant reinforcing elements such as wires, filaments, and single strands or multi-stranded assemblies (i.e. containing two or more strands) of natural or synthetic textile material, metal or any other suitable substance.

The joining according to the invention is effected by the imbrication or overlapping of steps formed on each of the ends of the two belts by suitable cutting of the longitudinal cables, this cutting being effected, according to an essential feature, in such a way as to provide equal "stages" or tiers on each of the steps, each strand being cut at a constant longitudinal distance from the cut end of the adjacent cable.

A joint made according to the invention ensures that when the joining is finished and the conveyor is operated, there will be substantially optimum homogeneous tension in the cables of the two belts.

The drop in resistance may in practice be made as low as required by increasing the length of the joint.

The invention will be more clearly understood from the description of an embodiment which follows, which description is given by way of non-limiting example and is illustrated by the accompanying figure of drawing which shows in diagrammatic form the cutting of the cables on one part of the two ends to be joined and the imbrication or overlapping of the steps. Other features of the invention will also become apparent in the course of the description.

The two belts 1 and 2, of elastic material, are reinforced by longitudinal steel cables 3 and 4 respectively. The diameter of the cables 3 ($d_3$) is greater than that of cables 4 ($d_4$).

The number of cables per centimetre of width of the belt is respectively $n_1$ and $n_2$ for the belts 1 and 2. It will be supposed that $n_2$ is greater than $n_1$.

The end of belt 1 has been stripped i.e. its coverings, and possibly elements of the carcass other than the longitudinal cables, have been removed, along a suitable length J.

The cables 3 have then been cut stepwise in equal stages or tiers $e_1$, according to the arrangement shown in the figure. One single cable 3 has been left at the points and in the recesses or hollows of the steps.

The number of stages or tiers $e_1$ formed in the length J is $p_1$.

The values taken for J and $e_1$ are the same as or greater than those which would be taken in order to effect a joining of belt 1 with a belt of the same structure.

The end of the belt 2 has similarly been stripped of its covering elements and its carcass elements other than the cables along an equal length J.

The cables 4 have then been cut in the prepared area in such a way as to provide steps capable of being fitted into the recesses of the end of belt 1.

The steps in the end of the belt 2 have several cables in the points and in the recesses, instead of one single cable as in the end of belt 1. However, the number of stages $p_2$ is different from $p_1$.

The stepped shape of the end of the belt 2 is determined by the number of cables to be cut in the recesses and by the number of stages $p_2$.

According to the invention the cables of the belt 2 are cut in stages such that the ratio between the number $p_2$ of these stages and the number $p_1$ of the stages provided in the belt 1 is substantially equal to the ratio between the number $n_2$ of cables per centimetre of width of the belt 2 and the number $n_1$ of cables per centimetre of width of the belt 1.

It has also been found that good results are obtained if a number $v$ of cables 4 are left in the points and in the recesses of the steps of the belt 2 such that $v$ is substantially equal to the product of the number $n_2$ of cables per centimetre of width of the belt 1 and the diameter, expressed in centimetres, of the cables 4 forming a longitudinal layer in the belt 2. As frequently the proportion $n_2/n_1$ and the product $n_2 d_4$ are not whole numbers, it is possible to round off $v$ to the whole number immediately above and $p_2$ to the whole number immediately below.

The steps thus effected in the end of the belt 2 fit correctly into the steps provided in the end of the belt 1.

The thicknesses of the longitudinal layers of the cables 3 and 4 with their covering mixtures are made equal by superimposing on the thinner sheet suitable layers of raw, i.e. non-vulcanized mixture.

When the steps of these two ends thus prepared have been fitted into each other as shown in the drawing, transversal "cord" fabric (not shown in the drawing) of a suitable material (for example nylon) which has been suitably treated (for example coated with a raw or non-vulcanized mixture by means of calendering), may be applied on one surface of the area of the joint.

The spaces existing locally between the steps of the ends 1 and 2 may be packed with cut pieces 5 of the non-vulcanized mixture. A transversal cord fabric (not shown) is then applied on the second surface of the joint.

Fixing pre-vulcanization is effected a suitable number of times on the carcass in the area of the joint. The covering mixture is then applied in layers of the desired number and thickness. Vulcanization is then effected with the desired number of pressings.

The drop in resistance of a joint of this type, if the length J is sufficient, is substantially equal to the maximum percentage of the cables of the end of the belt 2 which are cut along a transversal line. This percentage may thus be reduced to as low a value as desired by decreasing the number of steps and increasing the length J.

It goes without saying that the invention is not limited to the embodiment herein described, which can serve as the basis of numerous variants.

The invention particularly includes the case where the number $n_1$ is greater than $n_2$. In this case the joining would be effected in the same manner and the cutting would again be started on the end of the belt having the lower number of cables.

The invention also applies to belts reinforced with at least one longitudinal layer of natural or synthetic textile cables.

I claim:

1. The method of joining ends of first and second lengths of conveyor belt material wherein each of said first and second lengths is reinforced with at least one layer of longitudinal parallel cables and have at least one layer of carcass material covering said cables, said first end having cables of greater diameter than the cables of said second end, the operations of stripping off said at least one layer of carcass material over portions of said ends, cutting said cables of each of said ends in stepwise formation so that each step in said first end has only one cable and the number of steps in said second end to the number of steps in said first end is at most equal to the ratio between the numbers of longitudinal cables per centimetre of width in said second and first lengths respectively fitting said ends together, packing raw unvulcanized carcass material in the spaces between said step wise formation of said cables, recovering the interfitted ends with carcass material, and vulcanizing said carcass material.

2. The method according to claim 1, wherein each step in said second end has at least two cables.

3. The method according to claim 1, wherein the number of cables in each step in said second end is at least equal to the product of the number of longitudinal cables per centimetre of width of said second length of belt and the diameter in centimetres of the cables of said second length.

4. The method according to claim 1 further comprising the steps of applying at least one layer of fabric having cords extending transversely of the belt over the said interfitted ends prior to vulcanization.

References Cited by the Examiner

UNITED STATES PATENTS

| | | | |
|---|---|---|---|
| 1,735,686 | 11/1929 | Kimmich | 156—502 |
| 2,182,169 | 12/1939 | Bierer | 156—304 |
| 2,506,915 | 5/1950 | Bishop | 161—36 |
| 3,101,290 | 8/1963 | Paul | 161—36 |

FOREIGN PATENTS

| | | |
|---|---|---|
| 319,416 | 9/1929 | Great Britain. |

EARL M. BERGERT, *Primary Examiner.*

DOUGLAS J. DRUMMOND, *Examiner.*